United States Patent
Friend et al.

(10) Patent No.: US 7,596,565 B2
(45) Date of Patent: Sep. 29, 2009

(54) SYSTEM AND METHOD FOR MAINTAINING WIRELESS FILE FOLDERS AT A WIRELESS DEVICE

(75) Inventors: John Friend, Los Altos, CA (US); Michael Belshe, Sunnyvale, CA (US)

(73) Assignee: Good Technology, Santa Clara, CA (US)

( * ) Notice: Subject to any disclaimer, the term of this patent is extended or adjusted under 35 U.S.C. 154(b) by 164 days.

(21) Appl. No.: 10/400,979

(22) Filed: Mar. 27, 2003

(65) Prior Publication Data

US 2004/0054739 A1     Mar. 18, 2004

Related U.S. Application Data

(63) Continuation-in-part of application No. 10/109,928, filed on Mar. 29, 2002, which is a continuation-in-part of application No. 09/924,283, filed on Aug. 7, 2001.

(51) Int. Cl.
    *G06F 17/30* (2006.01)
(52) U.S. Cl. ....................................................... 707/10
(58) Field of Classification Search ................. 707/201, 707/203, 2, 3, 10, 200; 379/88.13; 455/456.1, 455/414.1; 709/203, 217, 230, 248, 205, 709/206; 712/1; 715/501.1
See application file for complete search history.

(56) References Cited

U.S. PATENT DOCUMENTS

| | | | |
|---|---|---|---|
| 4,682,150 A | 7/1987 | Mathes et al. | |
| 5,049,881 A | 9/1991 | Gibson et al. | |
| 5,126,739 A | 6/1992 | Whiting et al. | |
| 5,159,592 A | 10/1992 | Perkins | |
| 5,321,840 A | 6/1994 | Ahlin et al. | |
| 5,469,161 A | 11/1995 | Bezek | |
| 5,553,281 A | 9/1996 | Brown et al. | |
| 5,559,800 A | 9/1996 | Mousseau et al. | |
| 5,563,595 A | 10/1996 | Strohacker | |
| 5,666,530 A | 9/1997 | Clark | |
| 5,715,387 A | 2/1998 | Barnstijn et al. | |
| 5,727,159 A | 3/1998 | Kikinis | |
| 5,727,202 A | 3/1998 | Kucala | |
| 5,760,716 A | 6/1998 | Mathews et al. | |
| 5,771,010 A | 6/1998 | Masenas | |

(Continued)

FOREIGN PATENT DOCUMENTS

EP     0666651     8/1995

(Continued)

OTHER PUBLICATIONS

Hild et al., "Mobilizing Applications", IEEE Personal Communications, Oct. 1997, XP-000721303, pp. 26-34.

*Primary Examiner*—Etienne P LeRoux
(74) *Attorney, Agent, or Firm*—Blakely, Sokoloff, Taylor & Zafman LLP

(57) ABSTRACT

In one embodiment, a server is disclosed. The server includes a messaging service, and an interface communicatively coupled to a wireless device. The interface maintains synchronization of data objects with the wireless device over a wireless network. Further, the server transmits message updates originating at the messaging service to the wireless device and receives message updates originating at the wireless device at the interface. The message updates indicate a modification to an electronic mail (e-mail) file folder hierarchy

16 Claims, 5 Drawing Sheets

U.S. PATENT DOCUMENTS

| | | | |
|---|---|---|---|
| 5,790,974 A | 8/1998 | Tognazzini | |
| 5,793,970 A | 8/1998 | Fakes et al. | |
| 5,802,312 A | 9/1998 | Lazaridis et al. | |
| 5,841,376 A | 11/1998 | Hayashi | |
| 5,870,610 A | 2/1999 | Beyda | |
| 5,903,230 A | 5/1999 | Masenas | |
| 5,930,471 A | 7/1999 | Milewski et al. | |
| 5,961,590 A | 10/1999 | Mendez et al. | |
| 5,974,238 A | 10/1999 | Chase, Jr. | |
| 5,987,464 A | 11/1999 | Schneider | |
| 6,023,708 A | 2/2000 | Mendez et al. | |
| 6,034,621 A | 3/2000 | Kaufman | |
| 6,052,735 A | 4/2000 | Ulrich et al. | |
| 6,065,017 A | 5/2000 | Barker | |
| 6,085,185 A | 7/2000 | Matsuzawa et al. | |
| 6,104,392 A | 8/2000 | Shaw et al. | |
| 6,111,707 A | 8/2000 | Buddecke et al. | |
| 6,151,606 A | 11/2000 | Mendez | |
| 6,182,117 B1 * | 1/2001 | Christie et al. | 709/205 |
| 6,216,157 B1 | 4/2001 | Vishwanath et al. | |
| 6,218,970 B1 | 4/2001 | Jaquette | |
| 6,226,618 B1 | 5/2001 | Downs et al. | |
| 6,259,891 B1 | 7/2001 | Allen | |
| 6,275,848 B1 | 8/2001 | Arnold | |
| 6,279,001 B1 | 8/2001 | DeBettencourt et al. | |
| 6,304,881 B1 | 10/2001 | Halim et al. | |
| 6,310,889 B1 | 10/2001 | Parsons et al. | |
| 6,330,618 B1 | 12/2001 | Hawkins et al. | |
| 6,343,299 B1 | 1/2002 | Huang et al. | |
| 6,347,340 B1 | 2/2002 | Coelho et al. | |
| 6,360,272 B1 | 3/2002 | Lincke et al. | |
| 6,384,850 B1 | 5/2002 | McNally et al. | |
| 6,393,434 B1 | 5/2002 | Huang et al. | |
| 6,396,482 B1 | 5/2002 | Griffin et al. | |
| 6,401,136 B1 | 6/2002 | Britton et al. | |
| 6,430,601 B1 | 8/2002 | Eldridge et al. | |
| 6,449,622 B1 | 9/2002 | LaRue et al. | |
| 6,457,062 B1 | 9/2002 | Pivowar et al. | |
| 6,460,055 B1 | 10/2002 | Midgley et al. | |
| 6,463,463 B1 | 10/2002 | Godrey et al. | |
| 6,463,464 B1 | 10/2002 | Lazaridis et al. | |
| 6,477,543 B1 | 11/2002 | Huang et al. | |
| 6,505,055 B1 | 1/2003 | Kahn et al. | |
| 6,535,892 B1 * | 3/2003 | LaRue et al. | 707/203 |
| 6,571,245 B2 | 5/2003 | Huang et al. | |
| 6,604,236 B1 | 8/2003 | Draper et al. | |
| 6,625,621 B2 * | 9/2003 | Tan et al. | 707/201 |
| 6,654,746 B1 | 11/2003 | Wong et al. | |
| 6,658,167 B1 | 12/2003 | Lee et al. | |
| 6,694,335 B1 | 2/2004 | Hopmann et al. | |
| 6,697,458 B1 | 2/2004 | Kunjibettu | |
| 6,701,378 B1 | 3/2004 | Gilhuly et al. | |
| 6,721,787 B1 | 4/2004 | Hiscock | |
| 6,721,871 B2 | 4/2004 | Piispanen et al. | |
| 6,757,698 B2 | 6/2004 | McBride et al. | |
| 6,779,019 B1 * | 8/2004 | Mousseau et al. | 709/206 |
| 6,792,085 B1 | 9/2004 | Rigaldies et al. | |
| 6,874,029 B2 | 3/2005 | Hutcheson et al. | |
| 6,874,037 B1 | 3/2005 | Abram et al. | |
| 6,901,415 B2 | 5/2005 | Thomas et al. | |
| 6,931,454 B2 | 8/2005 | Deshpande et al. | |
| 6,941,348 B2 | 9/2005 | Petry et al. | |
| 6,973,299 B2 | 12/2005 | Apfel | |
| 6,983,308 B1 | 1/2006 | Oberhaus et al. | |
| 7,003,776 B2 | 2/2006 | Sutherland | |
| 7,085,809 B2 | 8/2006 | Mori et al. | |
| 7,092,699 B1 * | 8/2006 | Hefter | 455/414.1 |
| 7,136,934 B2 | 11/2006 | Carter et al. | |
| 7,139,555 B2 | 11/2006 | Apfel | |
| 7,149,813 B2 | 12/2006 | Flanagin et al. | |
| 7,155,483 B1 | 12/2006 | Friend et al. | |
| 2001/0004744 A1 | 6/2001 | Lazaridis et al. | |
| 2001/0005864 A1 | 6/2001 | Mousseau et al. | |
| 2001/0034654 A1 | 10/2001 | Vigil et al. | |
| 2001/0054115 A1 | 12/2001 | Ferguson et al. | |
| 2002/0016818 A1 | 2/2002 | Kirani et al. | |
| 2002/0019225 A1 | 2/2002 | Miyashita | |
| 2002/0032722 A1 | 3/2002 | Baynes et al. | |
| 2002/0046286 A1 | 4/2002 | Caldwell et al. | |
| 2002/0119793 A1 | 8/2002 | Hronek et al. | |
| 2002/0120696 A1 | 8/2002 | Mousseau et al. | |
| 2002/0146240 A1 | 10/2002 | Ogawa et al. | |
| 2002/0160773 A1 | 10/2002 | Gresham et al. | |
| 2003/0046434 A1 | 3/2003 | Flanagin et al. | |
| 2003/0050046 A1 | 3/2003 | Conneely et al. | |
| 2003/0081621 A1 | 5/2003 | Godfrey et al. | |
| 2004/0054739 A1 | 3/2004 | Friend et al. | |
| 2004/0105423 A1 | 6/2004 | Koehler et al. | |
| 2004/0109436 A1 | 6/2004 | Vargas et al. | |
| 2005/0148356 A1 | 7/2005 | Ferguson et al. | |

FOREIGN PATENT DOCUMENTS

| | | |
|---|---|---|
| EP | 0909037 | 4/1999 |
| EP | 0917077 | 5/1999 |
| EP | 1014629 A2 | 6/2000 |
| EP | 1014629 A3 | 11/2001 |
| EP | 03719504 | 8/2006 |
| JP | 07-182263 | 7/1995 |
| JP | 10-269125 | 10/1998 |
| JP | 11-136365 | 5/1999 |
| JP | 2001-053785 | 2/2001 |
| JP | 2001-076040 | 3/2001 |
| WO | WO0067158 | 11/2000 |
| WO | WO-01/78342 | 10/2001 |
| WO | WO 01/78342 A2 | 10/2001 |
| WO | WO0219626 | 3/2002 |

* cited by examiner

SYSTEM AND METHOD FOR MAINTAINING WIRELESS FILE FOLDERS AT A WIRELESS DEVICE

This application is a continuation-in-part of co-pending U.S. application entitled System and Method for Full Wireless Synchronization of a Data Processing Apparatus with a Data Service, application Ser. No. 10/109,928, filed Mar. 29, 2002, which is a continuation-in-part of co-pending U.S. Application entitled Apparatus and Method for Conserving Bandwidth by Batch Processing Data Transactions, application Ser. No. 09/924,283, filed Aug. 7, 2001.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

This invention relates generally to the field of network data services. More particularly, the invention relates to an apparatus and method for synchronizing a wireless data processing device with a wireless messaging service.

BACKGROUND

A variety of wireless data processing devices have been introduced over the past several years. These include wireless personal digital assistants ("PDAs") such as the Palm® VIIx handheld, cellular phones equipped with data processing capabilities (e.g., those which include wireless application protocol ("WAP") support), and, more recently, wireless messaging devices such as the Blackberry™ wireless pager developed by Research In Motion ("RIM").™

Personal digital assistants such as the Palm devices typically provide only limited wireless messaging capabilities (e.g., instant messaging and basic Internet access). For example, these devices typically require a user to manually establish a connection to the Internet via an Internet Service Provider ("ISP") or to a corporate server to check e-mail messages.

Although corporate messaging systems such as the RIM Blackberry provide more comprehensive messaging capabilities, there are significant limitations to these systems. Specifically, these systems employ e-mail "redirection" or "forwarding" techniques in which messages are redirected to the wireless device only if certain conditions are met. These conditions, referred to as "redirection events," may include, for example, an indication that the user is not working at his corporate desktop (e.g., removal of the wireless device from the desktop cradle, a screen saver firing on the desktop, . . . etc) or a manual redirection command initiated by the user (e.g., via the wireless device or the corporate desktop). One such message redirection system is described in U.S. Pat. No. 6,219,694 ("System and Method for Pushing Information From a Host System to a Mobile Data Communication Device Having a Shared Electronic Address").

As a result, these systems are (as a practical matter) incapable of providing complete synchronization between the wireless device and the corporate e-mail database. For example, because messages are only redirected to the wireless device under certain conditions (e.g., following a redirection event), at any given point in time, the wireless device may contain an incomplete set of e-mail data. Moreover, even when messages are actively being forwarded to the wireless device, the e-mail data stored at the wireless device and the e-mail database are not truly synchronized. For example, certain types of transactions performed on the wireless device, such as an indication that a message has been viewed by the user, message deletions, movement of messages from one folder to another, . . . etc., are not updated at the e-mail service wirelessly.

Moreover, only basic e-mail functions such as sending and receiving messages may be controlled at the wireless device. More advanced e-mail management functions must be set at the user's desktop (e.g., configuring e-mail filters, outgoing e-mail signatures, security settings such as passwords, . . . etc).

In addition, prior messaging systems require a corporate desktop to which the device must be attached when the user is in the office. The problem with this is not merely that a corporate desktop is required, but also that the corporate desktop must be configured with software and a proprietary "cradle" that allows it to communicate directly to the wireless device.

Accordingly, what is needed is a system and method for providing complete synchronization and management between a wireless device and a messaging service (e.g., a corporate e-mail account). What is also needed is a wireless apparatus for receiving and sending e-mail messages, which does not require a corporate desktop or any software to be installed and executed on the corporate desktop.

SUMMARY

According to one embodiment, a system is described. The system includes a wireless data processing device, and a server implementing a messaging service communicatively coupled to the wireless device. The server maintains synchronization of data objects with the wireless device over a wireless network. In addition, the server transmits message updates originating at the messaging service to the wireless device and receives message updates originating at the wireless device. The message updates indicate a modification to an electronic mail (e-mail) file folder hierarchy.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

An Exemplary Network Architecture

Figure 1:
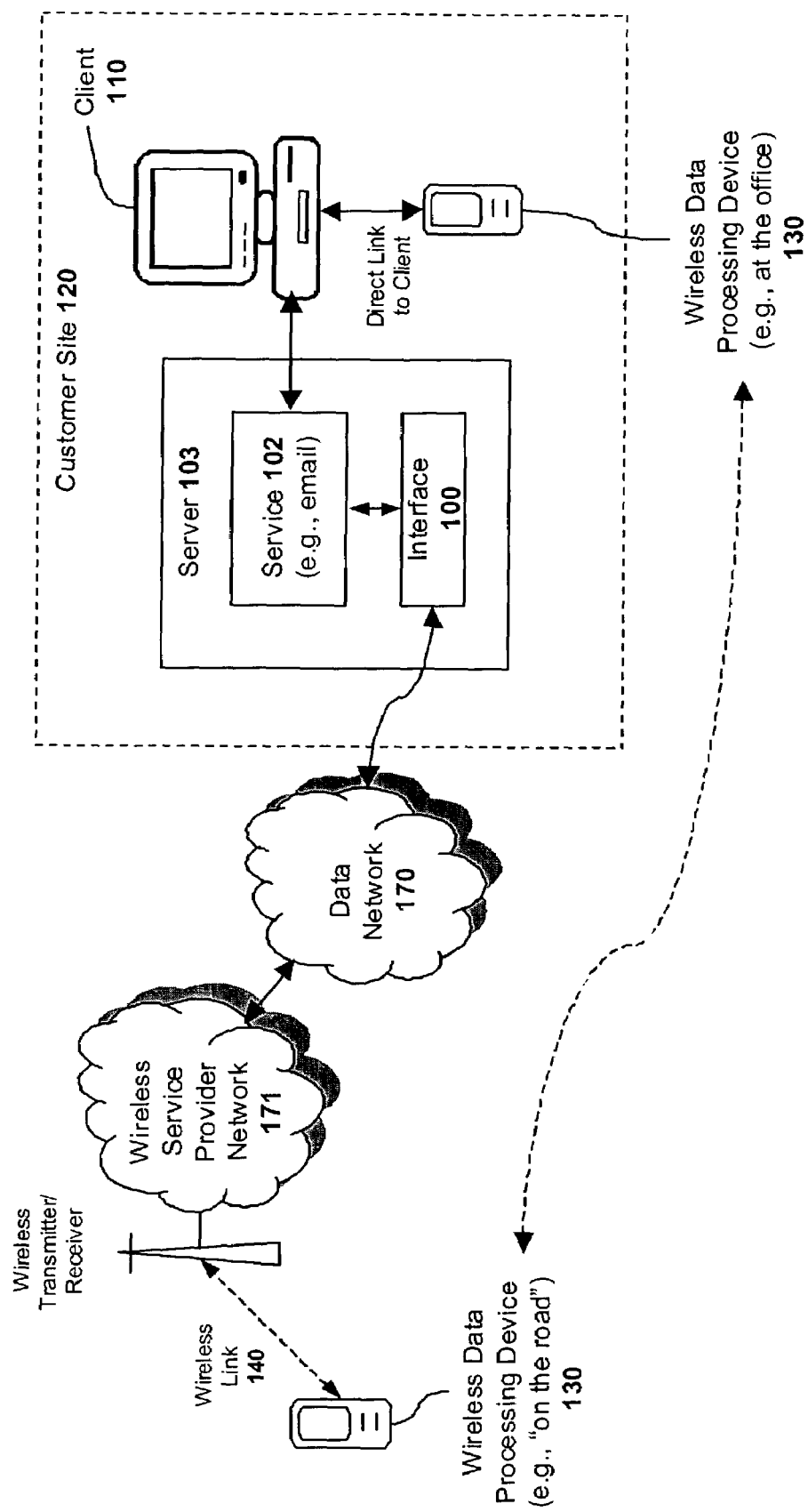
FIG. 1 illustrates an exemplary network architecture used to implement elements of the present invention.

FIG. 1 illustrates one embodiment of a network architecture. A "customer site" 120 illustrated in FIG. 1 may be any local-area or wide-area network over which a plurality of servers 103 and clients 110 communicate. For example, customer site 120 may include all servers and clients maintained by a single corporation.

Servers 103 may be configured to provide a variety of different messaging and groupware services 102 to network users (e.g., e-mail, instant messaging, calendaring, . . . etc). In one embodiment, these services are provided by Microsoft Exchange.™ However, the underlying principles of the invention are not limited to any particular messaging/groupware platform.

In one embodiment, an interface 100 forwards data objects maintained by service 102 (e.g., e-mail messages, instant messages, calendar data, . . . etc) to a plurality of wireless data processing devices (represented in FIG. 1 by wireless device 130) via an external data network 170 and/or a wireless service provider network 171. For example, if the service 102 includes an e-mail database, the interface 100 transmits any new e-mails, which arrive in a user's mailbox on the service 102 to the user's wireless data processing device 130 (over the network(s) 170 and/or 171).

Alternatively, or in addition, the service 102 may provide the e-mail to the user's local computer (e.g., client 110) upon request (i.e., so that the user will receive the e-mail on his/her wireless device 130 when out of the office and on his/her personal computer 110 when in the office). Conversely, e-mail messages sent from the user's wireless data processing device 130 are transmitted to the service 102 via the interface 100.

In one embodiment, the interface 100 is a software module adapted to work with the particular service 120. It should be noted, however, that interface 100 may be implemented in hardware or any combination of hardware and software while still complying with the underlying principles of the invention.

In one embodiment, external data network 170 is comprised of a plurality of databases, servers/clients (not shown) and other networking hardware (e.g., routers, hubs, . . . etc) for transmitting data between the interface 100 and the wireless devices 130. In a further embodiment, interface 100 encapsulates data in one or more packets containing an address identifying the wireless devices 130 (e.g., such as a 24-bit Mobitex Access Number ("MAN#")).

The external data network 170 transmits the packets to a wireless service provider network 171, which in turn, transmits the packets (or the data contained therein) over a wireless communication link to the wireless device 130. In one embodiment, the wireless service provider network is a 2-way paging network. However, various other network types may be employed (e.g., CDMA 2000, GPRS, PCS, . . . etc) while still complying with the underlying principles of the invention.

It should be noted that the network service provider network 171 and the external data network 170 (and associated interface 100) may be owned/operated by the same organization or, alternatively, the owner/operator of the external data network 170 may lease wireless services from the wireless service provider network. The underlying principles of the invention are not limited to any particular service arrangement.

In one embodiment, service 102 (e.g., the e-mail database) is fully synchronized with wireless data processing device 130. Thus, any actions performed on wireless device 130 are automatically updated on service 102 and any transactions occurring at service 102 are automatically reflected on device 130. In one embodiment, these individual message transactions are transmitted from the interface 100 as they occur at the service 102.

In a further embodiment, synchronization updates of this type may include, but are not limited to, device configuration modifications, calendar updates, e-mail message updates, instant messages, to-do list updates and/or any other type of personal information management transactions or corporate data management transactions (hereinafter "message transactions").

As one example, when a user views an e-mail message using device 130, a message transaction indicating that the user viewed the message is transmitted to service 102 (via the interface 100). Accordingly, if the user subsequently connects to e-mail via a client 110, the e-mail will appear as having already been viewed.

Other actions such as message deletions, filing activities (e.g., moving a message to a particular folder), message responses, meeting confirmations/additions . . . etc, will automatically be reflected in the service 102, thereby providing complete synchronization between the service 102, the device 130 and/or the client 110 (if one is being used).

Current messaging systems do not offer complete wireless device synchronization. As such, these systems require that the user have a desktop computer with a "cradle" to which the device is attached to received certain types of synchronization updates. One reason for this is that prior systems process message transactions in a relatively inefficient manner and employ only limited compression techniques, thereby making complete synchronization impractical. As such, in order to realize complete wireless synchronization, embodiments of the invention employ one or more of the following compression and/or message processing techniques.

Wireless Folders

According to one embodiment, synchronization updates are also used to implement wireless folders. Consequently, a replication of an e-mail file folder hierarchy on server 103 at customer site 120 is maintained at wireless device 130. According to another embodiment, all changes made to the folder hierarchy at wireless device 130 are automatically changed at server 103, and vice versa. Therefore, message transactions are transmitted between wireless device 130 and server 103 for actions such as the creation of new folders, the deletion of old folders, filing of messages to folders, arrival of new messages, and copying of messages to a folder, In one embodiment, "move" events are detected and processed in an efficient manner. Move events may indicate that one or more new folders have been created, folders have been deleted, or folders have been reorganized. In addition, move events may indicate that messages have been moved between folders.

Figure 2:
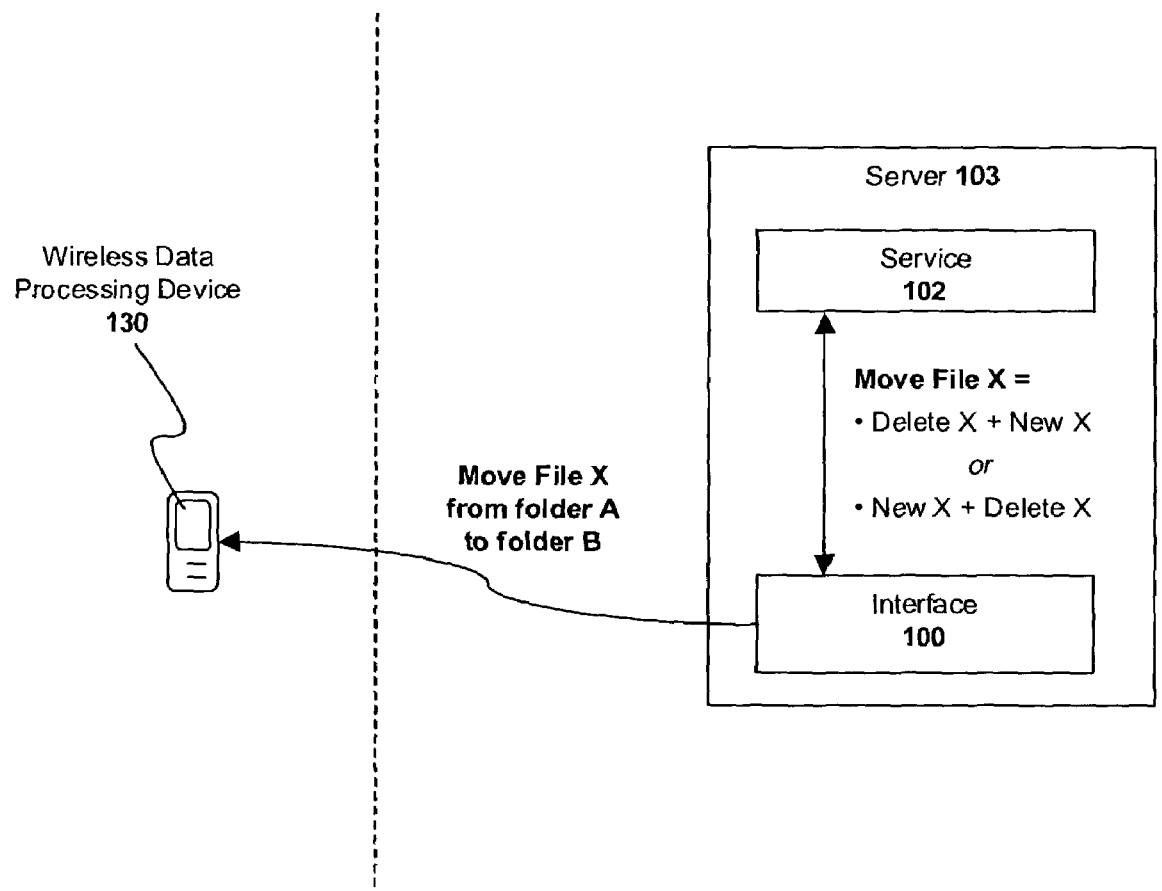
FIG. 2 illustrates an embodiment of the invention in which a move command is transmitted to a wireless device in lieu of a delete command and a new command.

As indicated in FIG. 2 between service 102 and interface 100, when a message (or other data object) is moved from one folder to another on messaging systems such as Microsoft Exchange (e.g., from "sent mail" folder to a "saved mail" folder, from the "inbox" folder to a "read mail" folder, . . . etc), a new copy of the message is made in the location of the destination folder and the original message is then deleted from the source folder.

Alternatively, the message may initially be deleted from the source folder and then re-created in the destination folder. Transmitting a delete command followed or preceded by a copy of the underlying message to the wireless device 130 is an inefficient way to perform move transactions.

Accordingly, as indicated in FIG. 2, one embodiment of the interface 100 combines the "delete" and the "new" commands into a single "move" command using the data object (i.e., message) identification code, the source folder and/or the destination folder, thereby significantly reducing the amount of information transmitted across the wireless network.

In order to provide a move command to the wireless device 130 in this manner, the system (e.g., the interface 100) first identifies the folder and/or message that is to be moved. In one embodiment, interface 100 identifies the message using the methods set forth in FIG. 3 and/or FIG. 4, either alone or in combination.

Figure 3:
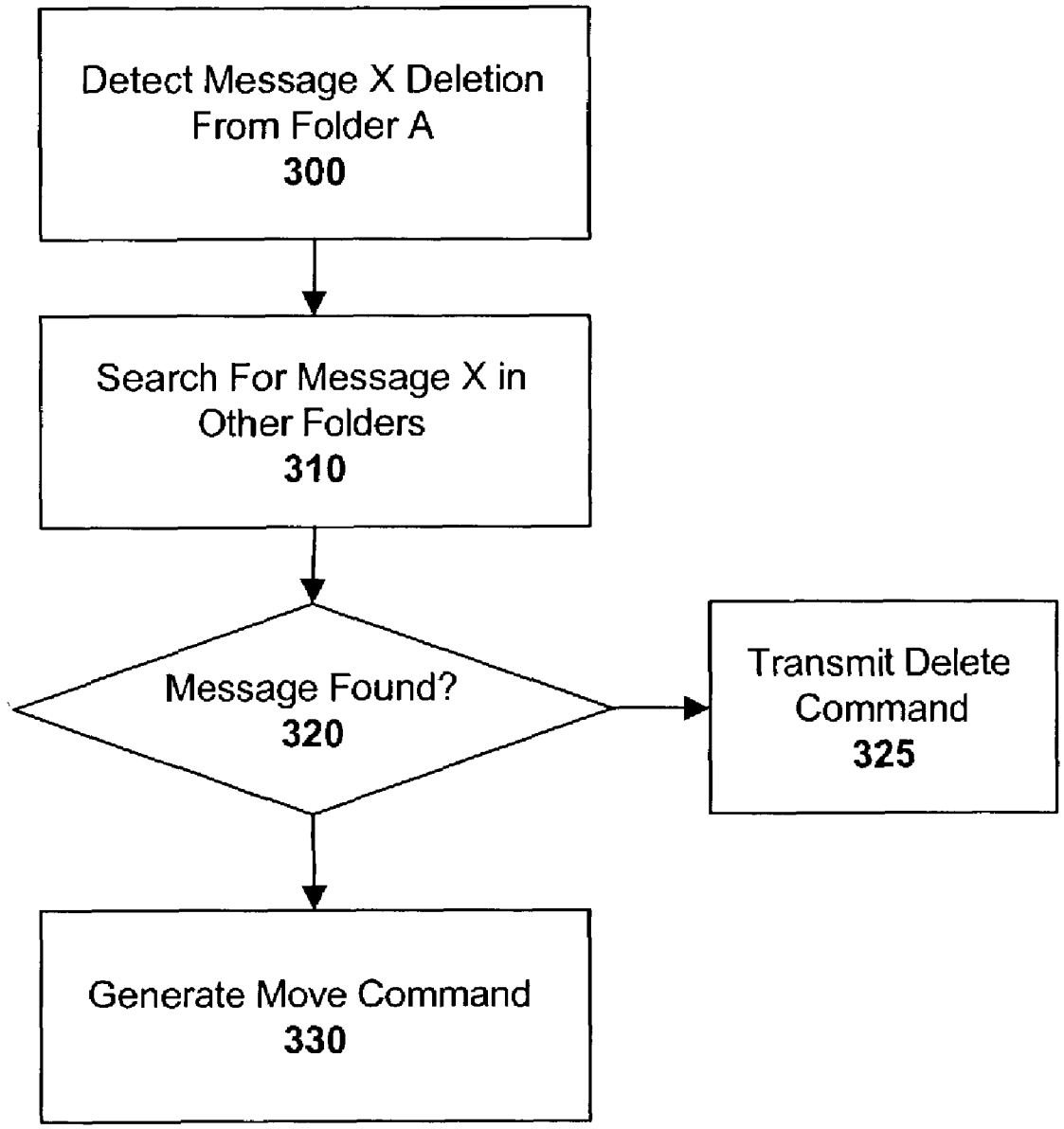
FIG. 3 illustrates one embodiment of a flow diagram for generating a move command.

Referring initially to FIG. 3, at 300 the interface 100 detects that Message X has been deleted from Folder A, or that Folder A itself has been deleted. At 310, interface 100 attempts to determine if the deletion forms part of a move command. As such, interface 100 searches other folders in the user's account to locate the same message.

If interface 100 finds the same message in a particular folder, e.g., Folder B, it transmits a move command to the wireless device 130 at 330 indicating that Message X should be moved from Folder A to Folder B. If, however, it does not locate Message X in another folder, it transmits a delete command to the wireless device indicating that Message X should be deleted from Folder A. In addition, one of ordinary skill in the art will appreciate that the method above may also be used to delete a Folder X that may or may not be filed under Folder A.

Figure 4:
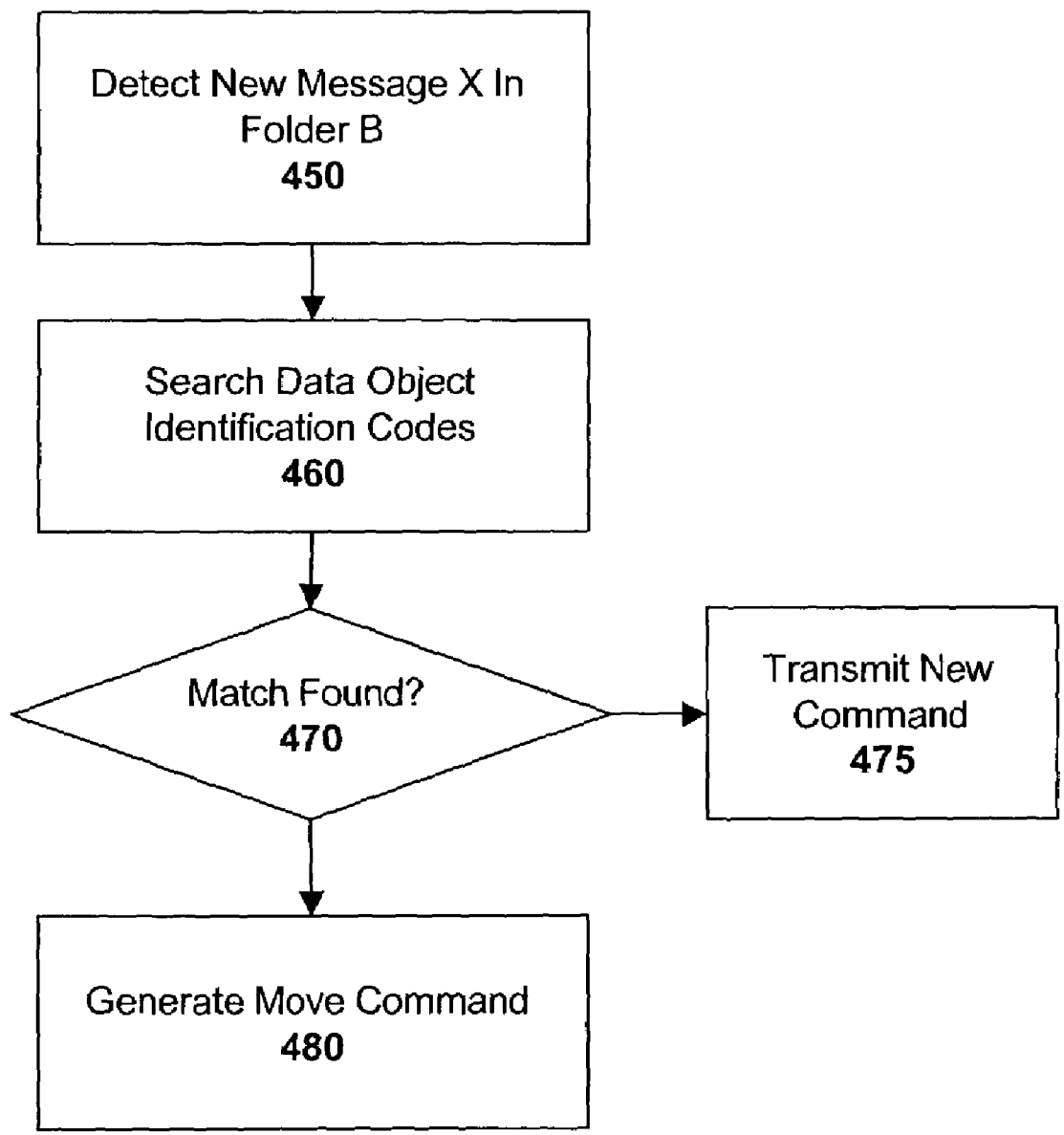
FIG. 4 illustrates another embodiment of a flow diagram for generating a move command.

Referring now to FIG. 4, in one embodiment, interface 100 initially detects that Message X has arrived in Folder B. In response, interface 100 searches a table of data object identification codes to locate a match for the identification code associated with the Message X. If a match is found (determined at 470), then the interface 100 transmits a move command to wireless device 130 indicating that Message X should be moved from Folder A to Folder B.

If, however, interface 100 does not locate an identification code match, interface 100 transmits a delete command to the wireless device indicating that Message X should be deleted from Folder A. Further, one of ordinary skill in the art will appreciate that the method above may also be used to move a Folder X that may or may not be filed under Folder B.

In one embodiment, messages received at server 102 may be automatically forwarded to a reserve folder specified by the user. In such an embodiment, the reserve folder is set up to receive public e-mails that a user may not wish to read until a later time. In a further embodiment, only the message header (e.g., subject line and to/from information) of e-mails forwarded to the reserve box are transmitted as message updates to wireless device 130 in order.

Upon receiving the header information, the user may choose whether or not to retrieve the full message. If the user decides to retrieve the full message, wireless device 130 transmits a message to server 103 requesting the full e-mail. Subsequently, server 103 transmits the full text of the e-mail to wireless device 130.

Exemplary Computer System

Figure 5:
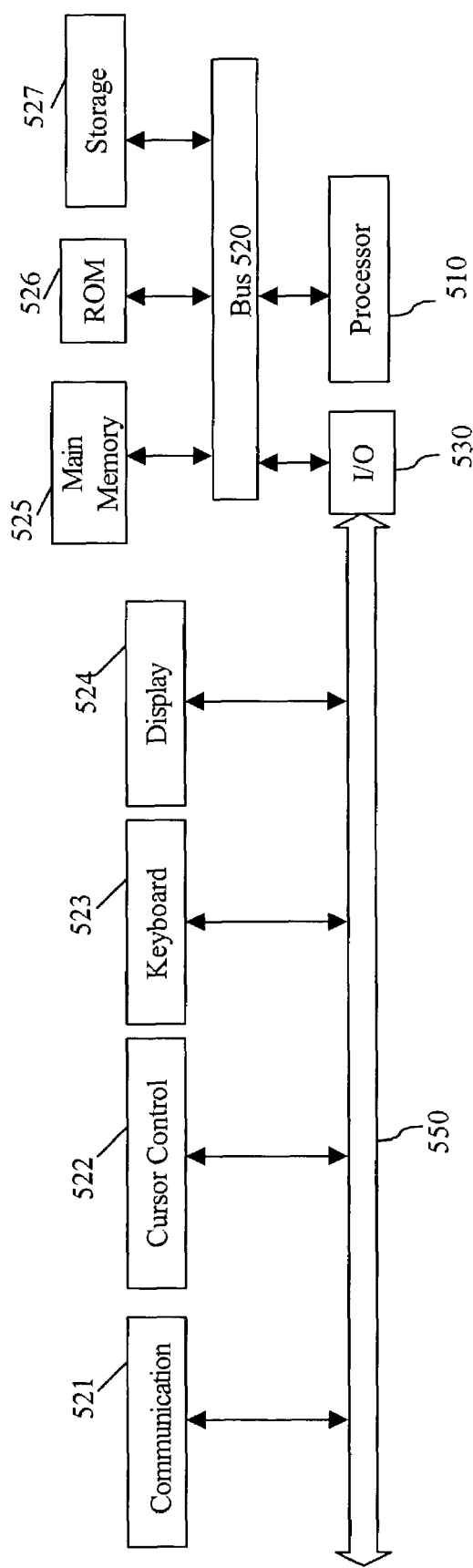
FIG. 5 illustrates one embodiment of a computer system.

FIG. 5 illustrates a computer system 500 on which wireless device 130 and or server 103 may be implemented. Computer system 500 includes a system bus 520 for communicating information, and a processor 510 coupled to bus 520 for processing information. According to one embodiment, processor 510 is implemented using one of the multitude of Motorola DragonBall MC68328-family of microprocessors. Nevertheless one of ordinary skill in the art will appreciate that other processors may be used.

Computer system 500 further comprises a random access memory (RAM) or other dynamic storage device 525 (referred to herein as main memory), coupled to bus 520 for storing information and instructions to be executed by processor 510. Main memory 525 also may be used for storing temporary variables or other intermediate information during execution of instructions by processor 510. Computer system 500 also may include a read only memory (ROM) and/or other static storage device 526 coupled to bus 520 for storing static information and instructions used by processor 510.

A data storage device 525 such as a magnetic disk or optical disc and its corresponding drive may also be coupled to computer system 500 for storing information and instructions. Computer system 500 can also be coupled to a second I/O bus 750 via an I/O interface 530. A plurality of I/O devices may be coupled to I/O bus 550, including a display device 524, an input device (e.g., an alphanumeric input device 523 and/or a cursor control device 522).

The communication device 521 is for accessing other computers (servers or clients) via network 170. The communication device 521 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details.

For example, while illustrated as an interface 100 to a service 102 executed on a server 103 (see FIG. 1), it will be appreciated that the underlying principles of the invention may be implemented on a single client in which the client transmits data over a network.

Moreover, although described in the context of a wireless data processing device, the underlying principles of the invention may be implemented to compress data in virtually any networking environment, both wired and wireless. Accordingly, the scope and spirit of the invention should be judged in terms of the claims which follow.

What is claimed is:

1. A system comprising:
   a synchronization server implementing a messaging service to receive alerts indicating a message deletion from a folder in a folder hierarchy, to determine where the deleted message was moved by searching the folder hierarchy for the message, and based on the determination to initiate synchronization of data objects by automatically transmitting a message update; and
   a wireless data processing device having synchronization circuitry to receive the message update from the synchronization server, and to detect a message deletion and message movement at the wireless data processing device from a folder in the folder hierarchy, and to initiate a second synchronization of data objects with the synchronization server over a wireless network by automatically transmitting a message update to the synchronization server as a message is being deleted or moved from the folder, wherein the message update includes two or more move events and indicates a delete message event or a move message event.

2. The system of claim 1 wherein the move message event indicates that a new folder has been created.

3. The system of claim 1 wherein the move message event indicates that a folder has been deleted.

4. The system of claim 1 wherein the move message event indicates that a folder has been moved.

5. The system of claim 1 wherein the move message event indicates that a new message has been filed in the folder.

6. The system of claim 1 wherein the wireless data processing device detects move events indicating that one or more folders have been modified.

7. A wireless data processing device comprising:
   synchronization circuitry to detect a message deletion and a message movement from a holder in a folder hierarchy and to initiate synchronization of data objects with a server over a wireless network by automatically transmitting a message update to the server as a message is being deleted or moved from the folder, wherein the message update includes two or more move events and indicates a delete message event or a move message event.

8. The wireless data processing device of claim 7 wherein a move message event indicates that a new folder has been created.

9. The wireless data processing device of claim 7 wherein a move message event indicates that a folder has been deleted.

10. The wireless data processing device of claim 7 wherein a move message event indicates that a folder has been moved.

11. The wireless data processing device of claim 7 wherein a move message event indicates that a new message has been filed in the folder.

12. A system comprising:
    messaging service;
    an interface communicatively coupled to the messaging service to receive alerts from the messaging service indicating a message deletion from a folder in a folder hierarchy at the messaging service; and
    a wireless data processing device having synchronization circuitry to receive the message update from a synchronization server, to detect a message deletion and message movement at the wireless data processing device from a folder in the folder hierarchy and to initiate synchronization of data objects with the synchronization server over a wireless network by automatically transmitting a message update to the synchronization server as a message is being deleted or moved from the folder, wherein the message update includes two or more move events and indicates a delete message event or a move message event.

13. The wireless data processing device of claim 12 wherein a move message event indicates that a new folder has been created.

14. The wireless data processing device of claim 12 wherein a move message event indicates that a folder has been deleted.

15. The wireless data processing device of claim 12 wherein a move message event indicates that a folder has been moved.

16. The wireless data processing device of claim 12 wherein a move message event indicates that a new message has been filed in the folder.

* * * * *